United States Patent [19]

Sederquist

[11] Patent Number: 4,533,607

[45] Date of Patent: Aug. 6, 1985

[54] PROCESS FOR REMOVING ELECTROLYTE VAPOR FROM FUEL CELL EXHAUST GAS

[75] Inventor: Richard A. Sederquist, Newington, Conn.

[73] Assignee: United Technologies Corporation, Hartford, Conn.

[21] Appl. No.: 678,611

[22] Filed: Dec. 6, 1984

[51] Int. Cl.³ .............................................. H01M 8/04
[52] U.S. Cl. ......................................... 429/13; 429/17
[58] Field of Search ....................... 429/17, 19, 20, 13, 429/16, 26

[56] References Cited

U.S. PATENT DOCUMENTS

| | | | |
|---|---|---|---|
| 3,677,823 | 7/1972 | Trocciola | 429/17 |
| 3,973,993 | 8/1976 | Bloomfield et al. | 429/17 |
| 3,976,507 | 8/1976 | Bloomfield | 429/17 |
| 4,001,041 | 1/1977 | Menard | 429/19 |
| 4,004,947 | 1/1977 | Bloomfield | 429/17 |
| 4,037,024 | 7/1977 | Landau | 429/17 |
| 4,072,625 | 2/1978 | Pinto | 48/196 A |
| 4,333,992 | 6/1982 | Healy | 429/26 |
| 4,372,759 | 2/1983 | Sederquist et al. | 429/17 |

Primary Examiner—Donald L. Walton
Attorney, Agent, or Firm—Stephen E. Revis

[57] ABSTRACT

Electrolyte vapor entrained in the hot exhaust gas stream from a fuel cell is removed by passing the gas stream through a saturator, over high surface area material, in direct contact with water circulating in a loop which also passes through the saturator. The hot gas stream evaporates a small portion of the water, resulting in cooling of the gas stream and condensing of electrolyte therein as it cools. The electrolyte dissolves into the recirculating water. The water is exchanged at predetermined intervals or when the concentration of electrolyte reaches a predetermined level. At least 99% of the electrolyte can be removed from the gas stream in this manner.

6 Claims, 1 Drawing Figure

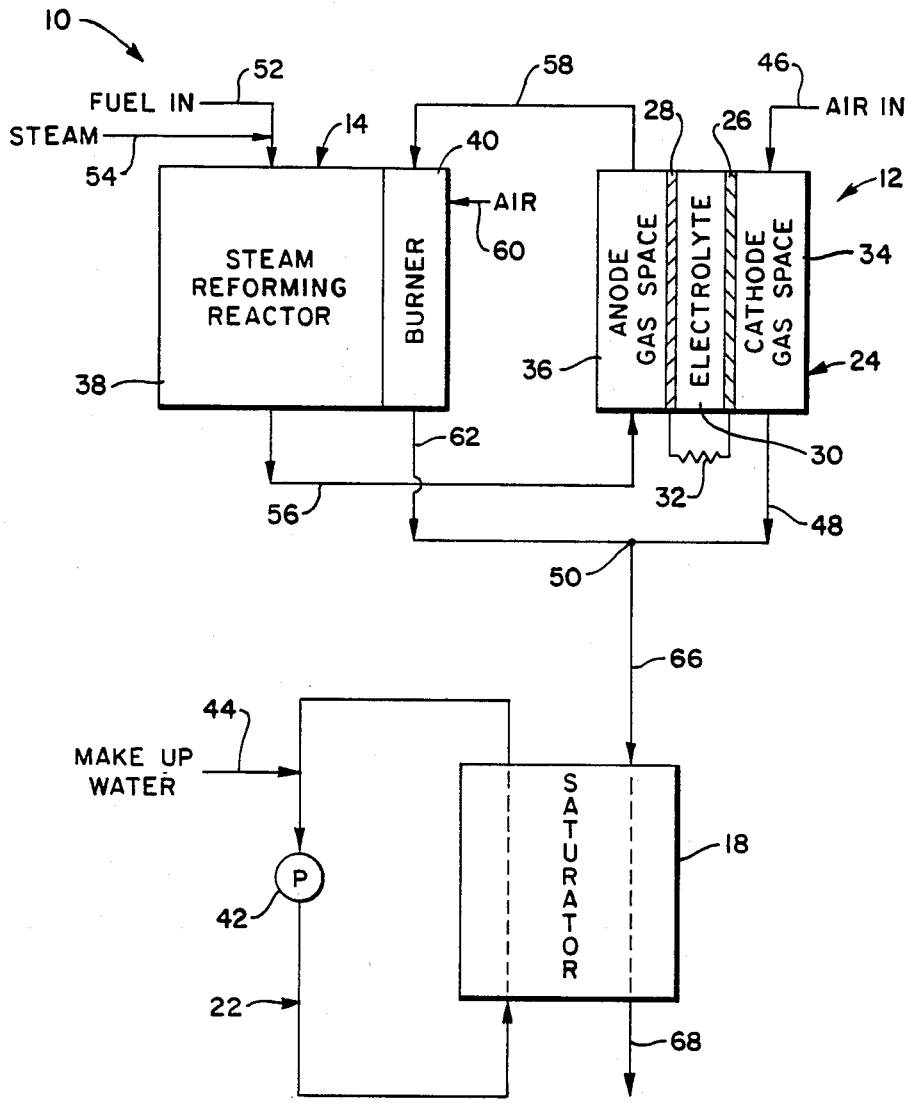

PROCESS FOR REMOVING ELECTROLYTE VAPOR FROM FUEL CELL EXHAUST GAS

DESCRIPTION

1. Technical Field

This invention relates to removing a vapor from a gas stream.

2. Background Art

Gas streams often contain vaporous constituents which need to be removed or separated for one reason or another, such as, to avoid undesireable consequences further down stream. For example, in electrochemical cells which utilize phosphoric acid as the electrolyte some evaporation of the electrolyte into the reactant gas streams occurs as the reactant gases pass through the cells. Although this evaporation is slight, the phosphoric acid which leaves the cell in the reactant gas stream is highly corrosive and it needs to be removed from the cell exhaust stream before it does damage to components down stream of the cell, and certainly before the exhaust is released into the environment.

Apparatus for removing liquids from gas streams are well known in the art. Many types are described and pictured in *Chemical Engineers' Handbook*, Fifth Edition (pp. 18-82 through 18-93), by R. H. Perry and C. H. Chilton, McGraw-Hill Book Company. One type particularly useful for removing acid mist from a gas stream involves passing the moist gas stream through a packed fiber bed. Mist particles collect on the fiber surfaces and are moved downwardly through and eventually drain from the bed by gravity (pp. 18-88 and 18-89).

In commonly owned U.S. Pat. No. 4,372,759 a system is disclosed for removing electrolyte from a fuel cell gas stream. The gas stream containing electrolyte vapor is supercooled utilizing conventional heat exchangers, and the supercooled gas stream is passed over high surface area passive, plate-type condensers. The condensed electrolyte is then drained from the apparatus and the remainder of the gas stream is passed on.

While plate-type condensers work well, they require very large contact surface areas which are expensive to fabricate. The efficiency of indirect heat transfer is also limited. One type of apparatus for removing unwanted vapors from a gas stream, but which avoids some of the disadvantages of plate-type condensers are contact scrubber systems. In those systems a continuous large volume stream of fresh liquid water passes through a high surface area packed bed simultaneously and in contact with the gas to be treated. Water evaporates into the gas stream and cools the gas stream to a temperature below the dew point of the vapor which is to be removed from the gas stream. The vapor condenses and becomes dissolved in the large mass of water flowing through the packed bed. This large mass of water leaving the device must now be treated to remove the condensate, such as in a stripper, before the water can be released back into the environment. Due to the large volume of water which must be continuously treated, and the low concentration of the condensate within the water, large, costly stripper units must be employed. (Note U.S. Pat. Nos. 4,037,024 and 4,040,435; see, also, 3,511,715 and 3,222,223).

In U.S. Pat. No. 3,865,929 sulfur (in the form of $H_2SO_4$) is removed from a hydrogen fluoride (HF) gas stream by cooling the gas stream with a spray of liquid HF which is recirculated. The sulfur is accumulated in the recirculating liquid, a portion of which is continuously withdrawn and filtered to remove the sulfur and is returned to the recirculating stream. The cleaned HF gas stream is condensed and liquid HF condensate is also sprayed into the incoming sulfur containing HF stream to assist in cooling and sulfur removal.

DISCLOSURE OF INVENTION

One object of the present invention is a process for removing a vaporous constituent from a gas stream.

Another object of the present invention is a cost effective process and means for removing electrolyte vapor from the exhaust gases of a fuel cell.

According to the present invention, a hot fuel cell exhaust gas stream containing electrolyte vapor passes through a saturator in direct contact with a mass of water which circulates in a loop which passes through the saturator, wherein the hot gas stream causes evaporation of a portion of the water, cooling the gas stream to below the dew point of the electrolyte resulting in condensation of the electrolyte, the condensate dissolving into the circulating water, and the evaporated water leaving the saturator in the gas stream. The circulating water stream is allowed to build up a significant concentration of electrolyte and is then exchanged for fresh water.

Very small quantities of electrolyte evaporate into the reactant gases as they pass through the cells; however, since most electrolytes are highly corrosive, even these small quantities must be removed before the exhaust gases can be released into the atmosphere. For example, the concentration of electrolyte vapor in an exhaust gas stream of an ambient pressure phosphoric acid fuel cell operating at about 400° F. is typically between 1 to 2 parts per million by volume. The hotter the fuel cell temperature, the greater the amount of electrolyte evaporation.

In the present process the direct contact between the recirculating water and the hot gas stream in the saturator results in evaporation, into the gas stream, of a small percentage of the circulating liquid water, the heat of vaporization coming from the cooling of the gas stream. The gas stream may be cooled in this manner to a temperature well below the dew point of the electrolyte vapor. As the temperature of the gas stream drops, acid condenses out of the gas stream and becomes dissolved in the circulating liquid water loop. The gas stream continues to drop in temperature until it is completely saturated with water (assuming the flow path is long enough to permit this to be accomplished). The gas approaches, in the limit, an equilibrium saturation temperature. Preferably, the recirculating water stream is neither heated nor cooled by external sources. In that case the equilibrium saturation temperature is the wet bulb temperature of the gas entering the saturator, and the entire electrolyte removal process is essentially adiabatic.

Analysis indicates that it is possible to remove over 99% of the electrolyte vapor in the exhaust gas stream using the process of the present invention. At the start of the process the loop of recirculating liquid water contains no acid, and there is a maximum acid gradient between the two streams, which helps drive the process. With time, the circulating water becomes more and more concentrated with acid, even though the water which is evaporated from the liquid stream into the gas stream is being replenished on a continuing basis. At a preselected concentration, or after a preselected period of time, this acid containing volume of water is removed for disposal and replaced with fresh water. Depending upon the system, this water exchange might be required or desirable every 3 months or perhaps less frequently, like once a year. For example, the water may be exchanged upon reaching a concentration of five hundred thousand parts per million acid (i.e., 50% acid). Disposing of a high concentration of acid in a relatively small volume of water is considerably easier than prior art acid removal techniques which require the continuous treatment of a flowing stream of water containing perhaps only 10 to 20 parts per million of acid.

The foregoing and other features and advantages of the present invention, will become more apparent from the following description and accompanying drawing.

BRIEF DESCRIPTION OF THE DRAWING

The sole FIGURE is a schematic representation of a fuel cell powerplant incorporating the features of the present invention.

BEST MODE FOR CARRYING OUT THE INVENTION

Consider, as an exemplary embodiment of the present invention, the powerplant depicted schematically in the drawing. The powerplant is generally designated by the reference numeral 10, and includes a fuel cell stack generally designated by the numeral 12, fuel conditioning apparatus generally designated by the numeral 14, a saturator 18, and a recirculating water loop 22. The fuel cell stack 12 may comprise any type of fuel cells which operate on gaseous reactants. In this embodiment the oxidant is assumed to be air and the fuel is assumed to be hydrogen. The stack 12 will generally comprise a plurality of fuel cells connected in series electrically through a load, but is herein depicted as only comprising a single cell 24, for ease of description. Each cell includes a cathode electrode 26 spaced from an anode electrode 28 and including an electrolyte retaining matrix 30 sandwiched therebetween. The electrodes 26, 28 are connected in series through a load 32. Each cell 24 also includes a cathode gas space 34 on the nonelectrolyte side of the cathode electrode 26 and an anode gas space 36 on the nonelectrolyte side of the anode electrode 28. In this embodiment the electrolyte is liquid phosphoric acid, but the process of the present invention is not intended to be limited to use with phosphoric acid fuel cells. For example, it is known that molten carbonate electrolytes can evaporate into the reactant gas streams in quantities sufficient to create problems downstream of the cells if such electrolyte is not removed from the exhaust gases.

As shown herein, the fuel conditioning apparatus 14 comprises a steam reforming reactor 38 in heat exchange relationship with a reactor burner 40. The fuel conditioning apparatus may also include other equipment, such as a shift converter and sulfur removal means. The requirements of the fuel conditioning apparatus are dependent, in part, upon the type of raw fuel being used and upon the particular design of the cells in the fuel cell stack. The usefulness and operability of the present invention are independent of the type of fuel conditioning apparatus used.

The saturator 18 is of the contact type wherein the gas stream to be saturated passes in direct contact with a stream of water passing through the saturator, preferably through a bed of high surface area inert packing material. Incorporated into the saturator 18 may also be a mist eliminator (demister) to remove any acid containing water droplets which might be produced in the saturator and entrained in the gas stream. In this invention water in the loop 22 is circulated through the saturator by a pump 42. Preferably, any water which is evaporated from the loop into the gas stream passing through the saturator is replenished via a conduit 44 to maintain a constant volume of water in the loop 22.

In operation, air enters the cathode gas spaces 34 via a conduit 46 and is electrochemically reacted within the cathode electrode 26, in conjunction with the fuel reaction at the anode electrode 28, to produce electricity, heat and water. Some of the water produced is evaporated into the air stream flowing through the cathode gas space. A small amount of electrolyte is unavoidably evaporated into the gas stream. The moist cathode effluent or cathode exhaust leaves the gas space 34 via a conduit 48 and is combined with exhaust gases from the burner 40 at location 50.

A gaseous hydrocarbon fuel, such as methane ($CH_4$), naptha ($C_nH_m$), natural gas, or the like is directed into the stream reforming reactor 38 in vaporous form via a conduit 52, along with steam via a conduit 54. Processed fuel in the form of hydrogen gas, carbon oxides, and some water and other impurities leave the reactor 38 via a conduit 56 and is further treated, such as in a shift converter (not shown) which converts carbon monoxide into additional hydrogen and water. The reaction products from the shift converter, which is essentially hydrogen and carbon dioxide, is directed through the anode gas spaces 36 of the stack 12. The hydrogen electrochemically reacts within the anode electrode 28 and leaves the anode gas spaces by means of a conduit 58. It, too, contains both water vapor as well as a very small amount of electrolyte vapor. The anode exhaust is directed into the burner 40 of the fuel conditioning apparatus 14. Air is also introduced into the burner 40 via a conduit 60. The unused hydrogen in the anode effluent combines with the air and is burned to provide the heat for the steam reforming reaction. The burner products are exhausted from the burner 40 via a conduit 62 and are combined with the cathode effluent products at location 50.

These hot gases are then directed into the saturator 18 via a conduit 66. In the saturator 18 the gases pass through a bed of high surface area inert material in direct contact with water in the loop 22 which simultaneously flows through the packed bed either co-current or countercurrent to the flow of gases therethrough. The high surface area material of the saturator may be plastic, ceramic or metallic saddles, rings or other suitable packing material, or trays. The hot gases cause evaporation of a portion of the liquid water. The water vapor exits with the gases from the saturator via a conduit 68.

As the water evaporates into the gas stream within the saturator the temperature of the gases drops. When the dew point of the electrolyte in the gas stream is reached, the electrolyte begins to condense and continues to condense out as the gas stream continues to drop in temperature. As the temperature continues to drop the dew point of the electrolyte in the gas stream decreases and additional electrolyte vapor condenses from the gas stream. If the saturator is properly sized, the gas stream can approach complete saturation with water. At that point its water partial pressure will be equal to the vapor pressure in the circulating water, and no further water will evaporate. Thereafter no further temperature drop occurs. Assuming negligible heat loss or temperature change of the water as it travels around that portion of the loop 22 outside the saturator, and assuming negligible water temperature change due to the addition of make-up water, the recirculating water loop will reach an equilibrium temperature substantially the same as the temperature of the gas stream leaving the saturator. In the limit, this is the wet bulb temperature of the inlet gas stream. Due to the great difference between the saturation temperatures of water and most electrolytes (at any given pressure), virtually all of the electrolyte can be condensed from the gas stream and dissolved into the circulating water loop using a saturator of reasonable size.

In an ambient pressure fuel cell system the exit gas saturation temperature (wet bulb) that can be achieved is approximately 160° F. At that temperature theoretically all of the acid in the gas stream would be removed. In the acid condenser described in U.S. Pat. No. 4,372,759 operating at a gas exit of 260° F., theoretically a maximum of only 99% of the acid in the fuel cell exhaust could be removed. Assuming similar acid removal contact areas, the saturator of the present invention would be superior to the acid condenser of the patent in the elimination of minute quantities of acid in the gas stream. If the acid condenser of the patent were to be operated around 160° F. gas exit temperature, then it would be very likely that liquid water would also form in the device resulting in a very dilute acid collection which would have to be treated continuously or removed at much more frequent intervals. The present saturator system is also superior in that no control is required to maintain optimum temperature in the device. If the acid condenser (U.S. Pat. No. 4,372,759) is operated too cold it causes liquid water to condense, too high and the acid removal efficiency is compromised. The saturator system of the present invention inherently operates at a stable operating temperature near the gas stream wet bulb temperature.

Although the invention has been shown and described with respect to a preferred embodiment thereof, it should be understood by those skilled in the art that other various changes and omissions in the form and detail thereof may be made therein without departing from the spirit and the scope of the invention.

I claim:

1. In a process for operating a fuel cell comprising an electrolyte disposed between a pair of electrodes, wherein an oxidant gas is passed through the cell on the nonelectrolyte facing side of one electrode and a fuel gas is passed through the cell on the nonelectrolyte facing side of the other electrode, and wherein electrolyte evaporates into one or both of the reactant gas streams as they pass through the cell, the process of removing electrolyte vapor from the gas streams containing such vapor comprising:

continuously recirculating a mass of liquid water in a loop, including passing said mass of water through a saturator; and passing the hot exhaust gas stream to be treated through the saturator in direct contact with the liquid water passing through the saturator, the circulating water absorbing heat from the gas stream and evaporating as a result of such heat absorption, thereby cooling the gas stream to a temperature below the dew point of the electrolyte to be removed from the gas stream, wherein the electrolyte condenses and dissolves into the circulating liquid, wherein the evaporated water is carried out with the gas stream, and wherein all of the acid dissolved into the circulating liquid remains in the liquid as it circulates, increasing the concentration of acid on a continuing basis.

2. The process according to claim 1 including adding water to the liquid circulating in the loop as it evaporates to maintain a constant volume of water in the loop.

3. The process according to claim 1 wherein the electrolyte containing liquid is exchanged for fresh water upon reaching a predetermined concentration or after a predetermined interval of time.

4. The process according to claim 1 wherein the electrolyte in the gas stream is phosphoric acid and enters the saturator in concentrations between 0.5 and 10 ppm, by volume, and the step of condensing electrolyte comprises condensing phosphoric acid from the gas stream.

5. The process according to claim 1 wherein the step of condensing electrolyte comprises condensing at least 99% of the electrolyte from the gas stream.

6. The process according to claim 4 wherein the step of condensing comprises condensing at least 99% of the phosphoric acid from the gas stream in the saturator.

* * * * *